Patented Mar. 15, 1949

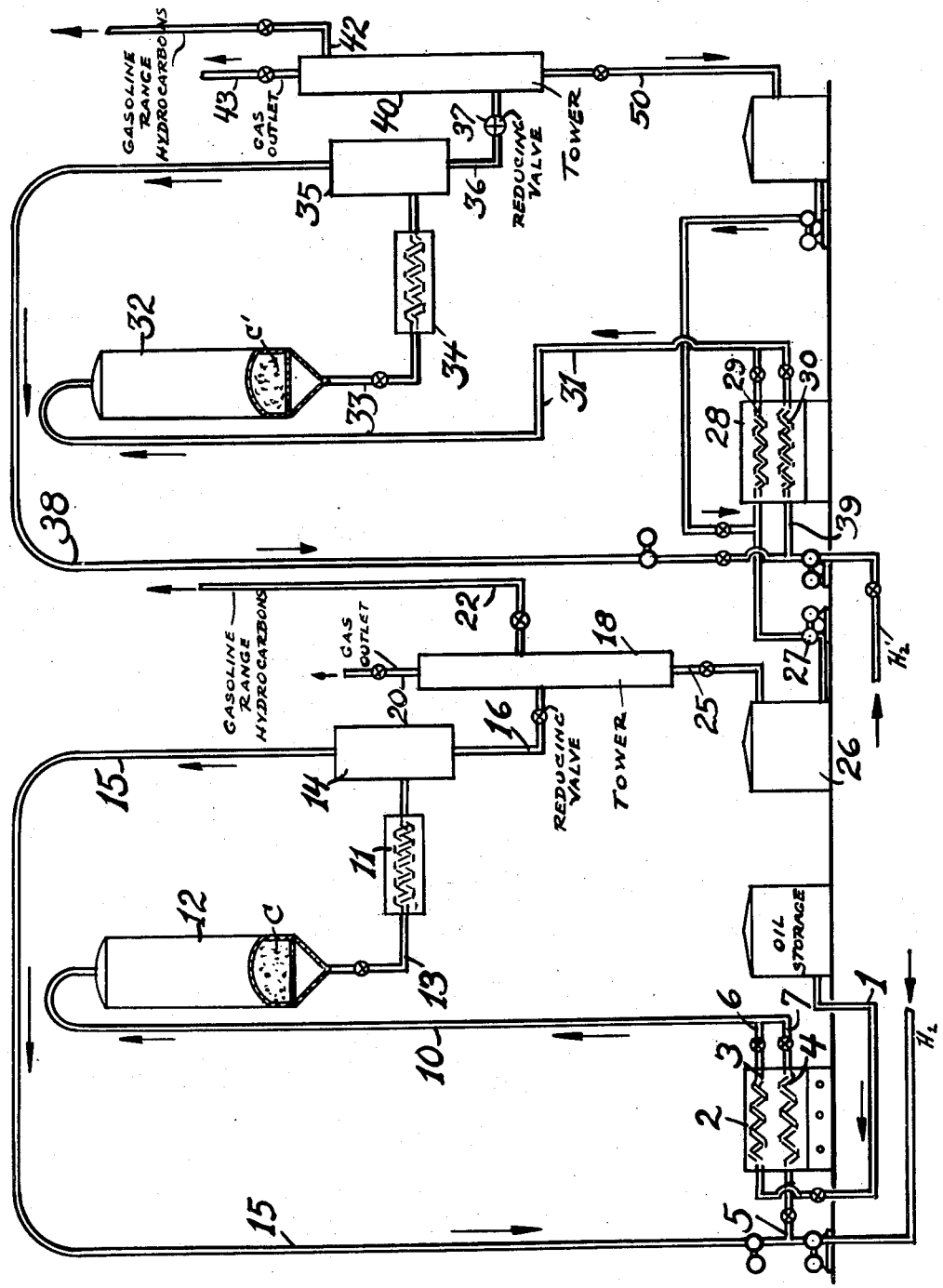

2,464,539

UNITED STATES PATENT OFFICE 2,464,539

TWO-STAGE DESTRUCTIVE HYDROGENATION OF PETROLEUM OIL

Alexis Voorhies, Jr., Baton Rouge, La., and Edward T. Marshall, Cranford, N. J., assignors to Standard Oil Development Company, a corporation of Delaware Application September 19, 1945, Serial No. 617,250

3 Claims. (Cl. 196—53)

The object of our invention is to convert hydrocarbon oils into products boiling within the gasoline range to obtain good yields of high quality materials.

Our invention pertains to the preparation of improved octane rating hydrocarbon material from a crude cycle stock by a low pressure destructive hydrogenation operation. A catalyst consisting essentially of an active hydrogenating metal deposited upon a suitable support has been found to be satisfactory for the proposed low pressure operation, which is much less costly than the high pressure operation. However, this type of catalyst is easily deactivated by sulfur-containing feed stocks, and it is therefore necessary to remove sulfur from the hydrocarbon feed prior to its contact with the supported metal catalyst. The sulfur-compounds may be removed by hydrogenating the hydrocarbon feed in the presence of a sulfur-resistant catalyst, such as supported metal sulfides, prior to the proposed low pressure operation, and this operation has been found to be more satisfactory at high pressures.

In carrying our improvements into effect, we therefore subject a petroleum oil to a two-stage destructive hydrogenation process. The first stage is conducted at high pressures, and a sulfur-resistant catalyst, such as a bentonitic clay impregnated with tungsten sulfide, is employed to convert a portion of the feed stock to a high octane number gasoline. In the second stage, which is effected at lower pressures, only the hydrogenated cycle stock produced in the first stage is used as feed stock. Since the hydrogenated cycle stock is much purer and less refractory than the original virgin feed, it is possible to employ the lower operating pressures. The catalyst for this step may be the same catalyst used in the first stage, viz. a sulfur-resistant catalyst, but we prefer to use in the second stage a sulfur-sensitive type and low pressures. As a result of operations according to this procedure, higher octane number gasoline is produced, and/or equipment costs for a new plant are lower, and/or the catalyst life is lengthened.

The use and preparation of "sulfactive" or sulfur-resistant catalysts in processes of hydrogenation and destructive hydrogenation of hydrocarbons carried out at high temperatures and pressures is already known in the art. The term "sulfactive" as applied to these catalysts means that they retain their hydrogenating activity even in the presence of substantial quantities of sulfur or sulfur compounds. Particularly active catalysts of the sulfactive type comprise the oxides or sulfides of metals of the sixth group of the periodic system, either alone or in admixture with oxides or sulfides of metals of the second group of the periodic system. Group eight sulfides are also active hydrogenation catalysts of the sulfur-resistant type. Examples of especially active catalysts of this type are: (1) mixtures of molybdenum oxide, zinc oxide, and magnesium oxide; (2) molybdenum sulfide; (3) tungsten sulfide supported on activated clay; (4) iron sulfide supported on activated bentonitic clay or the like.

The present invention therefore makes use of new and highly active catalysts for hydrogenating oils. These catalysts may be used for long periods of time in the hydrogenation of carbonaceous materials containing relatively small quantities of sulfur or sulfur compounds. The nature of these improved catalysts, the manner in which they are prepared, and the conditions under which they may be used will be more fully understood from the following description.

The improved catalysts of the sulfur-sensitive type consist essentially of metallic nickel, cobalt, or iron deposited upon highly active cracking catalysts such as activated bentonitic clay, aluminum silicate, synthetic impregnated or plural gels of silica and alumina, silica and magnesia, or silica and alumina and magnesia, or acid-treated clays of the bentonitic and montmorillonitic type. The quantity of metal in the catalyst may be between 1 and 15% by weight and is preferably between 4 and 10% by weight. The active carrier may or may not first be treated with fluorine, hydrofluoric acid, fluosilicic acid, or other fluorine-containing compounds.

These sulfur-sensitive catalysts may be prepared by impregnating the active carrier with a solution of a soluble salt of the metal, preferably the nitrate, then extruding or otherwise shaping the plastic mass so obtained, and drying the extruded mass in a steam oven at about 300–400° F. If the nitrate has been used for impregnation, nitric acid as oxides of nitrogen and water vapor will be evolved in this drying operation. Thereafter the dried mass is heated in a furnace to a temperature between 500 and 800° F. for a period of 10 to 12 hours or more in order to decompose the remaining nitrates. This results in a catalyst comprising the metal oxide deposited on the carrier. The metal oxide is then reduced to the metal by circulating hydrogen over the catalyst while the temperature is gradually raised to between about 600 and 900° F. This reduction treatment may take place in the reaction vessel in which the catalyst is to be used, and immediately following complete reduction, the hydrogenation may be begun by introducing the oil feed. In some cases it is found that the activity of these catalysts may be increased still further by treating the metallic catalyst prepared in the manner just described with sulfur-containing gases, such as hydrogen sulfide, and then subsequently removing the sulfur by treatment with hydrogen or hydrogen and a sulfur-free oil.

The method of preparing the improved sulfur-sensitive catalysts will be better understood from the following description of the preparation of a catalyst comprising about 7% metallic nickel on hydrofluoric acid-treated activated bentonitic clay:

About 100 pounds of an acid-treated activated bentonitic clay as obtained from the manufacturer is charged to a suitable mixing device, and about 100 pounds of a 10% hydrofluoric acid solution is added thereto. The clay and solution are thoroughly mixed for a period of about an hour. A thin slurry is formed which is continuously charged to the top of a suitable drying furnace. The inlet temperature of the furnace is maintained at about 350° F. and the outlet temperature at about 600° F. The dried hydrofluoric acid-treated clay so obtained will still contain about 20% of volatile matter. It is then ground to a powder of about 200 mesh size.

The activity of the catalyst is improved by heating of the base, that is to say, the activated bentonitic clay, to temperatures within the range of from about 600–1200° F. and preferably, from about 800–1000° F.

About 100 pounds of the ground, dried hydrofluoric acid-treated activated clay so obtained is charged to another mixing device which may be similar to the first one and about 4 gallons of a solution containing about 31 pounds of nickel nitrate ($Ni(NO_3)_2.6H_2O$) is added thereto. This quantity of nickel nitrate is equivalent to about 9 pounds of nickel oxide or about 6.3 pounds of metallic nickel. The clay and solution of nickel nitrate are thoroughly mixed for about 30 minutes to obtain a semi-plastic mass suitable for immediate extrusion. If necessary, water may be added in sufficient amounts to make the mass more suitable for extrusion. Too much water should not be added because then a drying operation is required before extrusion.

The plastic mass is extruded in any suitable means for this purpose and the extruded mass is dried in a steam oven for about 8 or 9 hours at a temperature of about 325° F. The dried catalyst is then heated in a furnace to a temperature between 550 and 750° F. for a period of 12 hours to remove the last traces of nitrates.

The nickel oxide catalyst so obtained is placed in a suitable pressure vessel adapted to withstand pressures of 3000 pounds per square inch or more, and hydrogen free from sulfur and other impurities is circulated therethrough at a rate of about 1000 volumes of gas per hour. The temperature of the catalyst is raised at about 50° F. per hour to 325° F. and is maintained at this level for about 9 hours. The temperature is then raised further at about 30° F. per hour to 450° F. Thereafter it is raised at 20° F. per hour to 550° F. and at 10° F. per hour to about 600° F. or more and maintained at this level for about 24 hours. The catalyst is then ready for use.

The same general method of preparing the catalyst is applicable when a synthetic, impregnated gel of silica and alumina is used as the base instead of "Super Filtrol." The synthetic impregnated gel may be prepared in a number of different ways which are known in the art, one convenient method being as follows: Equal portions of sodium silicate solution and acid are mixed in such concentrations as to form a clear, colloidal solution of silicic acid which upon standing sets into a firm hydrogel structure. The hydrogel after being permitted to set until syneresis is fully developed is broken into small lumps and thoroughly washed until substantially free of reaction impurities. The silica hydrogel so obtained is impregnated with a solution of an aluminum compound which can be decomposed or converted into aluminum oxide, for example aluminum nitrate or aluminum acetate. The impregnated hydrogel is dried and then slowly heated to a temperature of about 700° F. or somewhat higher to convert the aluminum salt to the oxide and to convert the hydrogel into a dry gel. The resulting product is a synthetic impregnated gel of silica and alumina and may be used as the base material for preparing catalysts according to the present invention.

In preparing tungsten sulfide-supported catalyst, the same general method is employed, that is to say, the base or carrier is treated with hydrogen fluoride and activated by heating to temperatures from 800–1200° F. for 4–8 hours before impregnating with the active component of the catalyst. However, in the case where tungsten is impregnated into the catalyst, we prefer to use a solution of tungstic oxide in ammonium sulfide as the impregnating medium so that the catalyst will contain tungsten sulfide in its final form.

In the accompanying drawing, we have shown diagrammatically an apparatus layout in which the preferred modifications of our invention may be carried into practical effect.

Referring in detail to the drawing, a sulfur-containing hydrocarbon oil feed is introduced into the present system through line 1 and thence to furnace 2 where it is heated in the fired coil 3. Meanwhile, a hydrogen-containing gas is introduced into furnace 2 via line 5 and heated in fired coil 4. The heated oil and the hydrogen-containing gas are mixed in line 10 and discharged into a hydrogenation reactor 12 containing one of the hydrogenation catalysts C of the sulfur-resistant type, which we have previously described. The feed rates, temperatures, pressures, and the amount of hydrogen with respect to the oil are all adjusted so as to effect the desired degree of conversion (these conditions being set forth later), and the hydrogenated oil is withdrawn through line 13, passed into a cooler 11 and thence into a separator 14 from which hydrogen-containing gas is withdrawn overhead through line 15, while the bottoms are withdrawn through line 16, passed through a pressure reducing valve, and discharged into fractional distillation column 18 via line 16. From fractionator 18, normally gaseous hydrocarbons and some hydrogen are withdrawn overhead through line 20; a gasoline fraction is taken off through line 22 for product recovery and the gas oil portion of the oil is recovered through line 25 and passed to tank 26. This material in tank 26 is subjected to a second destructive hydrogenation treatment by first passing through pump 27 and thence furnace 28, where it is reheated in the fired coil 29, and then discharged via line 31 into a second reactor 32 with heated hydrogen introduced via lines 38 and 39 as described hereinafter. Reactor 32 contains a body of catalyst C' which may be of the sulfur-resistant type but is preferably of the sulfur-sensitive type, as previously described. Suitable conditions of temperature, pressure, feed rate of oil, and amount of hydrogen (which will be set forth later) are maintained within the reactor 32 so as to obtain the desired conversion. Destructively hydrogenated oil is withdrawn from vessel 32 via line 33 and discharged into cooler 34 and gas-liquid separator 35, wherein hydrogen-containing gases are removed in line 38 and recycled to the reaction zone 32 via line 39 and coil 30 in furnace 28. Bottoms from vessel 35 are removed through line 36 and are passed through reducing valve 37 to fractionator 40. From fractionator 40, a quantity of light or normally gaseous hydrocarbons is recovered overhead through line 43, and a quantity of heavy bottoms is recovered through line 50 and recycled to zone 32 after passage through furnace 28. The gasoline in line 22 (from fractionator 18) and that in line 42 (from fractionator 40) may be combined and purified according to known methods in an apparatus not shown.

Of course, it will be understood that the preceding description of the apparatus and the processing of the oil therethrough was given for the purpose of emphasizing the applicants' contribution and improvements, and in the interest of simplicity, a number of apparatus accessories such as pumps, compressors, heat exchangers, and the like, all of which are well-known in the art, have been purposely omitted from the drawing and the specification to focus attention on the applicants' improvements.

As to operating conditions in reactor 12, we prefer to operate at temperatures within the range of from 600 to 900° F., pressures within the approximate range of 1000 to 3500 pounds per square inch, feed rate of liquid oil to the reactor between 0.5 and 4 volumes of oil per volume of catalyst, and from 4000 to 20,000 cubic feet of hydrogen, measured at standard conditions, per barrel of oil.

In reactor 32 we may use less drastic conditions than in reactor 1, and one feature of the process in reactor 32 is that considerably lower pressures may be employed therein. Hence, in reactor 32 the preferred conditions are as follows: temperature, 500 to 800° F.; pressure, 500 to 1500 pounds per square inch; feed rate, 0.2 to 2.0 volumes of liquid oil per volume of catalyst; and 4000 to 20,000 cubic feet of hydrogen, measured at standard conditions, per barrel of oil.

In order that our invention may be more easily understood, we have set forth a description of the results obtained during a destructive hydrogenation operation carried out according to our preferred methods. A Quiriquire kerosene was hydrogenated at high pressures in the presence of a sulfur-resistant catalyst, and the hydrogenated cycle stock from this operation was passed to a second hydrogenation process conducted at lower pressures and in the presence of a sulfur-sensitive catalyst. The aviation gasoline obtained from the second step was examined to compare its properties with those exhibited by the hydrogenated material obtained from the high pressure stage operation on the original kerosene feed. The following table contains the data obtained during this reduction to practice of our invention.

|  | Feed | |
|---|---|---|
|  | Quiriquire Kerosene + 0.3% $CS_2$, Stage 1 | Cycle Stock from Stage 1, Stage 2 |
| Catalyst | [1] "A" | [2] "B" |
| Average, Temp., ° F | 745 | 579 |
| Pressure, p. s. i | 2,800 | 1,000 |
| Feed Rate, V./V./Hr.[3] | 2.0 | 0.5 |
| Gas Rate, CF/B Oil | 12,000 | 8,000 |
| Aviation Gasoline, Vol. per cent on Feed to Unit | 42 | 34 |
| Aviation Gasoline, Vol. per cent on Quiriquire Kerosene | 42 | 18 |
| Cycle Stock, Vol. per cent on Feed to Unit | 53 | 62 |
| Aviation Gasoline Inspection: |  |  |
| Per cent at 140° F | 5.5 | 4.0 |
| Per cent at 203° F | 71 | 59.5 |
| Per cent at 257° F |  | 97.0 |
| Octane Number, ASTM | 76.0 | 77.2 |
| Octane Number, ASTM+3 cc. TEL |  | 91.2 |

|  | Feed Stock |  |  |
|---|---|---|---|
| Cycle Stock Inspection: |  |  |  |
| Gravity, ° A. P. I | 33.4 | 41.2 | 46.4 |
| 5% at ° F | 373 | 305 | 278 |
| 50% at ° F | 444 | 370 | 307 |
| Final, ° F | 572 | 516 | 454 |
| Aniline Point, ° F | 131 | 130 | 132 |

[1] Catalyst "A": 8-9% tungsten oxide on HF-treated California Super Filtrol. (10% $WS_2$ in sulfided catalyst used here.)
[2] Catalyst "B": 7% Ni (10% NiO) on HF-treated Super Filtrol.
[3] Volumes of oil per volume of catalyst per hour.

In the above example, the hydrocarbons in the kerosene boiling range were hydrogenated at a pressure of 2800 p. s. i., a temperature of 745° F., and in the presence of a sulfur-active catalyst, to yield a hydrocarbon mixture having an ASTM octane rating of 76. When the hydrogenated cycle stock obtained in this operation was contacted with hydrogen and the supported nickel catalyst at a temperature of 579° F. and a pressure of 1000 p. s. i., the product boiling in the aviation gasoline range had an ASTM octane rating of 77.2. The advantage in octane number for the second-stage operation as compared to the first (77.2 vs. 76) would be even greater if the volatility of the second-stage gasoline (59.5% at 203° F.) had been equal to that of the first stage (71% at 203° F.). Normally, in conventional high pressure operation with sulfur-active catalysts, such as used in the first stage, the gasoline produced from the first-stage cycle stock would have a slightly lower octane number (about 1 point) than obtained in the first stage—which is just the opposite of the results in the foregoing example. It is therefore evident that a combination process effected such that once-through hydrogenation in the presence of sulfur-resistant catalyst at high pressures, followed by a lower pressure, recycle hydrogenation operation in the presence of a sulfur-sensitive catalyst, would result in a yield of aviation gasoline material possessing an octane number increased by about 1.5 points over that for product from a one-stage high pressure operation. The economic advantages inherent in this invention as applied to low pressure operation on the plant scale are obvious.

The data we have obtained show that the cycle stock from the first stage (53% based on Quiriquire kerosene) was passed to the lower pressure operation. The aviation gasoline obtained from the second step comprised an 18 volume per cent yield, based on the feed to stage 1. However, based on the feed to the unit, 34 volume per cent of aviation gasoline material was obtained in stage 2. The cycle stock from stage 2 (62 volume per cent based on feed to stage 2) would be employed in a recycle operation, and the ultimate yield of aviation boiling material, based on the feed to stage 2, is calculated to be 48 volume per cent. The overall yield of aviation boiling material based on Quiriquire kerosene would therefore be 48 volume per cent +42 volume per cent (obtained in stage 1), or 90 volume per cent.

To recapitulate briefly, our improvements go to destructive hydrogenation of hydrocarbon oils of the type of heavy naphthas, kerosene, and gas oils to produce motor fuel of high octane number.

It is our intention to claim the inherent novelties of our invention in the present disclosure as described in the appended claims.

What we claim is:

1. A process for the production of valuable hydrocarbon products by a two-stage destructive hydrogenation of petroleum oil in the presence of hydrogen at elevated temperatures and pressures, which comprises conducting the treatment in the presence of a catalyst selected from the class consisting of sulfides and oxides of group VI and group VIII metals of the periodic system supported on a normally solid siliceous material which promotes cracking, in the first stage of the process, recovering a crude product and subjecting the hydrogenated material boiling above gasoline from said portion to a second destructive hydrogenation process in the presence of a sulfur sensitive catalyst and a cracking catalyst conducted under milder pressure and temperature conditions than those employed in the first stage, and recovering from both stages a motor fuel of improved quality.

2. The method of claim 1 in which the catalyst employed in the second stage of the hydrogenation process comprises a metal selected from the group comprising nickel, cobalt, and iron deposited on an acid-treated material which promotes cracking.

3. The method of claim 1 in which the first stage is effected in the presence of a catalyst containing 1 to 15% by weight of tungsten sulfide on a carrier of acid-treated clay and at a pressure of at least 2500 pounds per square inch and in which the second stage is effected in the presence of a catalyst containing 1 to 15% by weight of metallic nickel deposited upon hydrofluoric acid-treated bentonitic clay, the pressure in this stage being at least 500 but not substantially higher than 1500 pounds per square inch.

ALEXIS VOORHIES, Jr.
EDWARD T. MARSHALL.

REFERENCES CITED

The following references are of record in the file of this patent:

UNITED STATES PATENTS

| Number | Name | Date |
|---|---|---|
| 1,995,604 | Davis | Mar. 26, 1935 |
| 2,045,795 | Pier et al. | June 30, 1936 |
| 2,191,157 | Pier et al. | Feb. 20, 1940 |
| 2,194,186 | Pier et al. | Mar 19, 1940 |
| 2,215,206 | Biggs et al. | Sept. 17, 1940 |
| 2,330,098 | Watts | Sept. 21, 1943 |
| 2,358,879 | Redcay | Sept. 26, 1944 |
| 2,392,579 | Cole | Jan. 8, 1946 |

OTHER REFERENCES

Mellor, "Comprehensive Treatise on Inorganic and Theoretical Chemistry," vol. 14, pages 447, 448, 563, vol. 15, page 33, Longmans Green & Co.